Aug. 8, 1950     M. DE ANGLIS     2,518,292
SEWAGE DISPOSAL SYSTEM
Filed Sept. 11, 1947
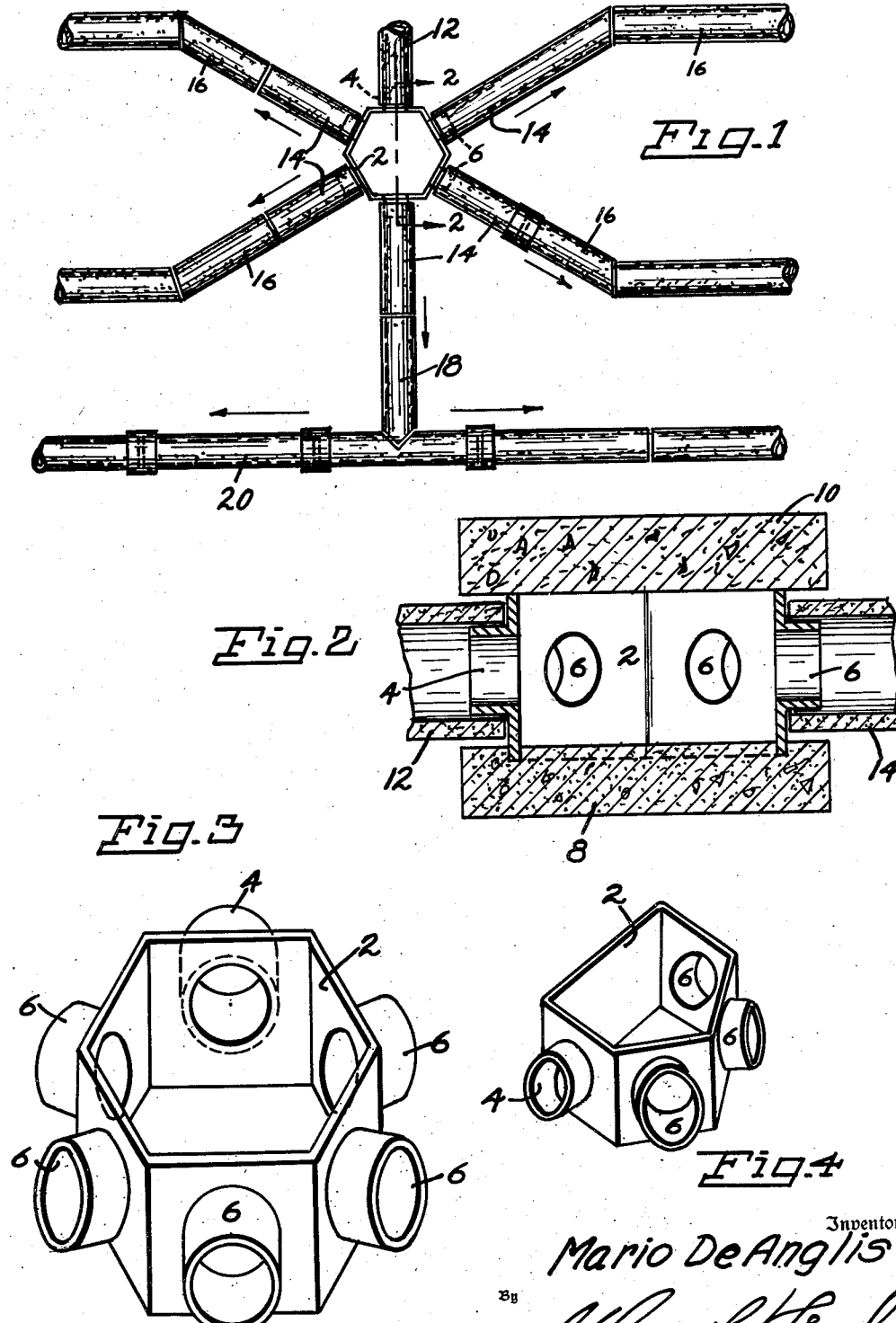
Inventor
Mario De Anglis Patented Aug. 8, 1950

2,518,292

UNITED STATES PATENT OFFICE 2,518,292

SEWAGE DISPOSAL SYSTEM

Mario De Anglis, Okanogan, Wash.

Application September 11, 1947, Serial No. 773,419

1 Claim. (Cl. 182—2)

My present invention relates to an improved sewage disposal system and more particularly to the arrangement of the underground dispersing piping of the type used in domestic and rural systems whereby the sewage is conveyed through underground piping to be disposed of by seepage and evaporation when discharged into the ground or onto a cinder bed.

The arrangement of my invention embodies a central discharge box from which dispersal pipes run at angles, the joints of the pipes being loose so that the sewage will seep therethrough into the ground. The system of my invention is simple to install and economical both in installation and use and will serve more efficiently than the present complex arrangements.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Fig. 1 is a top plan view of the sewage disposal pipe arrangement of my invention.

Fig. 2 is a vertical sectional view at line 2—2 of Fig. 1.

Fig. 3 is a perspective view of the dispersal box.

Fig. 4 is a perspective view of a modified form of box.

Referring now to the drawings wherein I have illustrated the present preferred embodiment of my invention I employ a box 2 of metal and here shown as hexagonal in Figs. 1, 2, and 3, and of quintagonal shape with one larger wall in Fig. 4, which box being open at the bottom and top is slightly embedded into a fluid concrete slab 8 and cover with a concrete slab 10, said box and its slabs being located beneath the surface of the earth to a desirable depth and below the frost line.

The box is provided with sleeves 6 on adjacent faces communicating with the interior of the box and to the sleeve 4 of the box I attach an inlet pipe 12 connecting with the sewage system of the building and comprising usually terra cocta pipe of conventional type.

From the sleeves 6 there extend the outlet pipes 14 and as shown one sleeve may have secured thereto a feeder pipe 18 connecting with a disposal pipe 20.

It will be noted that the joints connecting the pipe sections of pipes 14, 16, and 18 are loose and in fact the sections are slightly spaced from each other. Thus as the sewage enters the box 2 is will spread and flow through the outlet pipes and the feeder pipe and will seep through the joints and the portion that does not seep therethrough will flow from the open ends of the various disposal pipes.

If desirable the upper portions of the joints may be covered as by tar paper to prevent the upward flow of sewage and preventing earth from entering and clogging the pipes.

I have also found that the pipe arrangement may be well employed as a lawn watering system when located about 18 inches below the surface of the earth and water fed into the box 2 will disperse and provide moisture to the sub-surface.

From the above description it will be apparent that the arrangement of pipes and the box according to my invention will result in a saving of pipe, labor or installation, and a more efficient disposal of sewage.

Having thus fully described my invention what I claim as new and desire to secure by Letters Patent is:

The combination in a sewage disposal system, of an open top and bottom distributing box including a continuous multi-faced wall and molded concrete top and bottom closures therefor, integral exterior sleeves radiating from the faces of the wall, an inlet pipe connecting one of the sleeves with a sewage conveying system and outlet pipes connected with the other sleeves, one of said outlet pipes being directly connected with a sewage disposal pipe, and said outlet pipes comprising sections slightly spaced from each other to permit seepage of sewage.

MARIO DE ANGLIS.

REFERENCES CITED

The following references are of record in the file of this patent:

UNITED STATES PATENTS

| Number | Name | Date |
|---|---|---|
| 870,433 | Hodges | Nov. 5, 1907 |
| 1,110,898 | Conkle | Sept. 15, 1914 |
| 1,320,256 | McLeod | Oct. 28, 1919 |

FOREIGN PATENTS

| Number | Country | Date |
|---|---|---|
| 22,173 | Great Britain | A. D. Nov. 21, 1895 |
| 23,771 | Great Britain | A. D. Nov. 6, 1908 |